Reissued Dec. 21, 1943 Re. 22,407

UNITED STATES PATENT OFFICE 22,407

DRILLING FLUID

Frederick Konrad Daniel, Kew Gardens, N. Y., assignor to Hornkem Corporation, Long Island City, N. Y., a corporation of New York No Drawing. Original No. 2,328,426, dated August 31, 1943, Serial No. 226,888, August 26, 1938. Application for reissue October 7, 1943, Serial No. 505,415

6 Claims. (Cl. 252—8.5)

The present invention relates to drilling fluids and it particularly relates to liquid compositions which may be utilized in connection with the drilling of oil wells.

It has been found in drilling through rock strata and particularly in drilling oil wells that it is desirable to maintain a proper drilling fluid and maintain it in substantially unchanged condition during the entire drilling operation.

This drilling fluid or liquid should function to remove cuttings from the hole; to hold solids in suspension when the drill is stopped; to provide a mud sheath on the wall of the hole and thereby retard caving and sloughing; to seal off minor gas, oil and water bearing formations; by its hydrostatic head to suppress formation pressures; to lubricate the bit and drill pipe; and to cool the bit.

In providing a drilling fluid which will accomplish all of these functions, the fluid has to be of carefully balanced consistency and its "viscosity" should be as low as possible, or rather its mobility should be as high as possible while the fluid is in motion and the drill is operating.

On the other hand, it is also desirable that the liquid should form a gel upon standing, and that such a gel should have a low yield value and should break down to a liquid when the drilling operation is resumed. While the drilling fluid should set to a gel relatively slowly it should be instantaneously and easily broken up to form again the original low resistance drilling fluid when the drilling has been resumed.

In most cases, the native drilling fluids do not contain sufficient colloidal material to give the mud the desirable properties.

Bentonitic clays are therefore generally used to make the drilling fluid "thixotropic," as the described isothermal sol-gel transformation is called. However, in most cases the addition of these bentonitic clays causes the viscosity to be high, the time of solidification of this thixotropic drilling fluid to be too short and the gel strength to be too high.

Particularly where this drilling fluid has a high solid content, and/or an excess of free polyvalent cation and/or a wrong pH range, the time of solidification, i. e., the time required to convert the drilling fluid or liquid into a gel state, becomes very short and may be only a fraction of a second. Such liquids substantially behave like gels at all times and they do not function most satisfactorily as drilling fluids. In addition, the viscosity and gel yield value with such drilling fluids is greatly increased, whereas with the most satisfactory drilling liquid all that is desired is a low viscosity and low yield value, just sufficient to prevent rapid settling of the cuttings or the drilling residue in the hole when the drilling operation is suspended and to prevent the settling of the suspended particles forming part of the mud, such as clays, barytes, etc.

As an example of the type of drilling fluid which it is desired to attain, the following characteristics may be given:

Viscosity 15 centipoise for a 10½ lb. mud.
Initial gel in Stormer viscosimeter, 10 grams.
Gel after 10 minutes, 50–60 grams.

The pH of the fluid should lie between approximately 8 and 9.5.

It is the primary object of this invention to bring a colloidal drilling fluid into a condition as close as possible to the one characterized above.

It is also the object of the present invention to provide an improved drilling fluid which will be relatively stable during drilling operations, even though such a drilling fluid may be or become contaminated with acidic or alkaline materials tending to derange its pH value or become contaminated with fluids or liquids containing various salts and particularly calcium or magnesium salts which may tend to cause flocculation and/or thickening of the fluid.

A further object of the present invention is to provide an improved drilling fluid of the character above described in which there will be no tendency toward "burning" the fluid, i. e., separation of a solid phase in the gel from water (syneresis) and in which the drilling fluid will maintain a high degree of balance at all times.

Other objects will be obvious or will appear in the more detailed description set forth below.

In accomplishing the above objects, it has been found most satisfactory to increase the mobility and time of solidification of the fluid and to decrease the yield value of the gel by including in the drilling fluid certain types of phosphates, preferably those with at least two phosphorous atoms per molecule, which are stable at a pH of 8 or above.

It has been found most satisfactory to employ the pyrophosphates and particularly the alkali metal pyrophosphates such as the sodium and potassium pyrophosphates.

Although under certain conditions the normal pyrophosphates (Alk $Me_4P_2O_7$) or the acid pyrophosphates (Alk $Me_2H_2P_2O_7$) may be utilized by themselves, it is generally found most satisfactory to utilize a combination of tetrasodium or tetrapotassium pyrophosphate, having an alkaline reaction, and the corresponding acid pyrophosphates having an acid reaction.

The proportions of acid and normal pyrophosphate may be varied, but preferably they should be in a proportion where the resulting pH lies between 8 and 9.5.

This pyrophosphate solution will be highly stable and will differ in this respect from a metaphosphate-containing mud or drilling fluid. For example, with a drilling fluid having the optimum pH range from 8 to 9.5, sodium or potassium metaphosphate will tend to decompose into an orthophosphate, particularly at the relatively elevated temperatures usually occurring in oil wells.

As a result, in order to maintain a proper drilling mud, it would be necessary to continue to add the metaphosphate and as the metaphosphate is added and is converted into the orthophosphate there will result an increase in acidity and a decrease of the pH value of the whole system. In turn this will cause thickening of the drilling fluid and will counteract to a certain extent the initial thinning effect of the metaphosphate.

The pyrophosphate mixture having a pH range of 8 to 9.5 produces a most homogeneous and stable drilling fluid with a high degree of balance which will be highly mobile, and which will only solidify to a gel of low yield value after a relatively long time, which gel may be readily broken up to a fluid when the drilling operation is initiated or resumed.

In drilling fluids or muds, difficulties often arise when using phosphates, including pyrophosphates and metaphosphates, because of the tendency of these compounds to react with calcium, magnesium and other polyvalent cations always present in such fluids or muds. These reaction products do not have the desirable mud-enhancing properties of the above mentioned phosphates.

In counteracting this tendency and in restoring the balance of the drilling fluid, if it has already become contaminated as for example by salt water, it has been found most suitable to add various types of soluble precipitants for the calcium and magnesium salts which will have a great tendency to react with the calcium and magnesium salts. These precipitants thus will remove such salts from the drilling fluid or convert them into insoluble form before they have had a chance to react with or precipitate the metaphosphates or the pyrophosphates. Among the most satisfactory precipitants or balancing salts of this character, is trisodium or tripotassium orthophosphate and sodium or ammonium or potassium oxalate. Generally such trisodium phosphate, where employed, may be utilized in an amount varying, say from 2 to 10 parts for every 100 parts of the pyrophosphate . When abnormal conditions of saltwater or other contaminations are found, according to this invention an extra quantity of such precipitants may be added together with the pyrophosphates or metaphosphates, but preferably before the pyrophosphates are added, the object being to preserve the full strength and activity of the pyrophosphates or other mud-treating chemicals.

In addition to the possibility of contamination with precipitating salts, such as calcium or magnesium salts, there is also the ever present tendency that the drilling fluid may be subjected to acid or alkaline contamination, or to temperature or other conditions tending to cause its pH to change so that it will be without the preferred range of 8 to 9.5.

This contamination may be caused by an inclusion of various alkaline or acid waters or liquors in the drilling fluids from various strata or by inclusion of improper mud treating chemicals or even by inclusion of metaphosphate which might tend to give rise to the production of an acid when it is converted into an orthophosphate under the temperature and pH condition existing within the mud.

Although many combinations may be employed to buffer or protect the drilling fluid or mud from the change of pH, it has been found that the most satisfactory materials are combinations of relatively weak acids and their salts, such as for example combinations of boric acid and its salts or combinations of orthophosphoric acid salts.

In the former case it is possible to utilize a combination of boric acid and borax or some other sodium borate and in the latter case it is possible to utilize a combination of trisodium phosphate with either one or both of the corresponding acid phosphates, such as disodium hydrogen orthophosphate or dihydrogen sodium orthophosphate.

The ratio of borax to boric acid or of any other buffer components should be such as to maintain a pH of 8 to 9.5.

These buffer mixtures are generally utilized in amounts varying from ½ to 5 parts for every 10 parts of the pyrophosphate. These buffer combinations are particularly useful in drilling fluids which may be devoid of pyrophosphates or metaphosphates or other mud treating agents, in enhancing such drilling fluids or correcting such drilling fluids if they are not in proper balanced condition.

In such cases where the pH is far removed from the preferred range such quantities of the buffer alone or in combination with phosphates or other mud treating chemicals may be used as to bring mud back to its proper pH.

It has been found that the borax-boric acid buffer and the orthophosphate buffer often bring down the viscosity and gel strength of the mud so that the amount of pyrophosphate may be decreased or so that the pyrophosphate may be omitted.

An example of one type of a composition for treating drilling fluids is the following:

| | Pounds |
|---|---|
| Tetrasodium pyrophosphate (anhydrous) | 34.35 |
| Acid pyrophosphate | 18.90 |
| Borax | 15.45 |
| Boric acid | 13.75 |
| Trisodium phosphate | 3.45 |

This combination may be dissolved in 430 lbs. or more of cold water.

This mixture with its 10.3% pyrophosphates is more effective in increasing the mobility and time of solidification, and in reducing the gel strength than a 20% solution of metaphosphate. Some times one part of it is as effective as 1½ parts of a 20% solution of metaphosphate.

If a more concentrated solution of pyrophosphate is wanted, the sodium pyrophosphate may be partly or wholly replaced by tetrapotassium pyrophosphate. The latter is soluble to a very high degree, whereas only 6.5 parts of anhydrous tetrasodium pyrophosphate may be dissolved in 100 parts of cold water. $K_4P_2O_7$ is slightly more alkaline than $Na_4P_2O_7$, so that a little more acid pyrophosphate should be used in conjunction with the former in order to get the desirable pH range. Tetrapotassium pyrophosphate is a little less effective in reducing properties than the tetrasodium pyrophosphate.

The following is an example of a buffer solution having the desired pH which may be added alone to a drilling mud or in addition to the above combinations or together with the calcium precipitating compound:

| | Pounds |
|---|---|
| Boric acid | 45.5 |
| Borax | 54.5 |
| | 100.0 |

This may be readily dissolved in 600 lbs. of water.

Of course, where the trisodium phosphate is used as part of the buffer mixture, sufficient of it may also be included to react with the calcium and magnesium salts to remove them from the drilling fluid before action with the pyrophosphates present. In addition to these buffer combinations above stated, any other buffer combination producing a pH range of between 8 and 9.5 may be employed.

The combinations of the mud treating chemicals above described will give to drilling fluids a high stability and balance and will cause them to resist any change in pyrophosphate efficiency or pH value upon contamination with alkaline or acid liquors or water containing dissolved calcium or magnesium salts.

The treated drilling fluids will have a prolonged solidification time so that a gel will not form momentarily therein when the drilling has been stopped and at the same time the gel will have a low yield value so that it may be readily reconverted into a liquid upon resumption of the drilling operation.

Moreover, the fluid will most satisfactorily cool the pipe and bit and also most satisfactorily lubricate the bit during the drilling operation. It will have such consistency as to prevent quick settling of suspended rock particles and other large suspended particles in the well and yet it will not allow gas to become entrained in the mud, or if it does, it will permit it readily to escape. At the same time the drill fluid will maintain the suspension of the finely divided clay, iron oxides or barytes particles which are substantially finer than 200 mesh, while the larger suspended particles can be removed comparatively easily.

Furthermore, in many cases the boric acid-borax combination in itself acts to enhance the stability and balance of the drilling fluid and in certain conditions a boric acid-borax combination may be utilized to lower viscosity and increase the time of solidification in addition to having a buffer effect.

In addition to the alkaline metal salts of pyrophosphates, it is also possible to use various phosphates of higher molecular weight than the pyrophosphates and also combinations of phosphates with metallic oxides such as combinations with vanadium oxide, iron oxide and other metal oxides.

It is to be understood that the various specific proportions and compounds above mentioned have been mentioned by way of illustration and not by way of limitation and that many alternatives, modifications and changes may be made in the above identified procedures and compositions specifically described without departing from the essential features of the present invention, all of which it is intended to cover broadly by the present invention.

What is claimed is:

1. A method of treating a colloidal drilling fluid which comprises adding thereto a mixture of alkali metal acid and normal pyrophosphates having a pH between 8.0 and 9.5.

2. A process of correcting and protecting drilling muds which comprises adding thereto a combination of alkali metal normal and acid pyrophosphates and a buffer reagent capable of maintaining a pH of between 8 and 9.5.

3. A method of treating a colloidal drilling fluid which comprises adding thereto a composition of pH between 8.0 and 9.5 and substantially consisting of tetrasodium pyrophosphate ($Na_4P_2O_7$), an acid pyrophosphate ($Na_2H_2P_2O_7$), borax and boric acid.

4. A method of treating a colloidal drilling fluid which comprises adding thereto a mixture of tetra-alkali metal pyrophosphate and an acid alkali metal pyrophosphate containing a buffer substantially consisting of borax and boric acid said mixture having a pH between 8.0 and 9.5.

5. A stabilizing mixture for addition to a thixotropic mud drilling fluid which consists substantially of tetrasodium pyrophosphate, disodium acid pyrophosphate, borax, boric acid and trisodium orthophosphate in aqueous solution having a pH between 8.0 and 9.5.

6. A stabilizing mixture for addition to thixotropic mud drilling fluid which consists substantially of

| | Parts by weight |
|---|---|
| Tetrasodium pyrophosphate | 30 to 40 |
| Disodium acid pyrophosphate | 15 to 25 |
| Borax | 10 to 20 |
| Boric acid | 10 to 20 |
| Trisodium phosphate | 1 to 8 |

dissolved in 300 to 500 parts by weight of water, said mixture having a pH between 8.0 and 9.5.

FREDERICK KONRAD DANIEL.